United States Defensive Publication [19] (H) [11] T969,011

Vermeire [43] Apr. 4, 1978

[54] HOT MELT ADHESIVE EMULSION PROCESS

[75] Inventor: Hans F. Vermeire, Amsterdam, Netherlands

[73] Assignee: Shell Oil Company, Houston, Tex.

[21] Appl. No.: 821,879

[22] Filed: Aug. 4, 1977

[51] Int. Cl.[2] ..... C09J 7/02

[52] U.S. Cl. ..... 427/207 B

[57] ABSTRACT

A novel process for applying an adhesive to a substrate is disclosed, which process comprises:

a. melt blending a monoalkenyl arene/conjugated diene block copolymer, tackifying resin and extending oil to form a hot melt adhesive composition, b. emulsifying the hot melt with water and an emulsifying agent, and c. applying the resulting emulsion as a film on a substrate.

Preferably, the block copolymer is a styrene/isoprene block copolymer and the tackifying resin is selected from the group consisting of diene-olefin copolymers, hydrogenated resins, esters of resin, polyterpenes, terpenephenol resins, and polymerized mixed olefins.

4 Claims, 1 Sheet Drawing,

9 Pages Specification

The file of this unexamined application may be inspected and copies thereof may be purchased (849 O.G. 1221, Apr. 9, 1968).

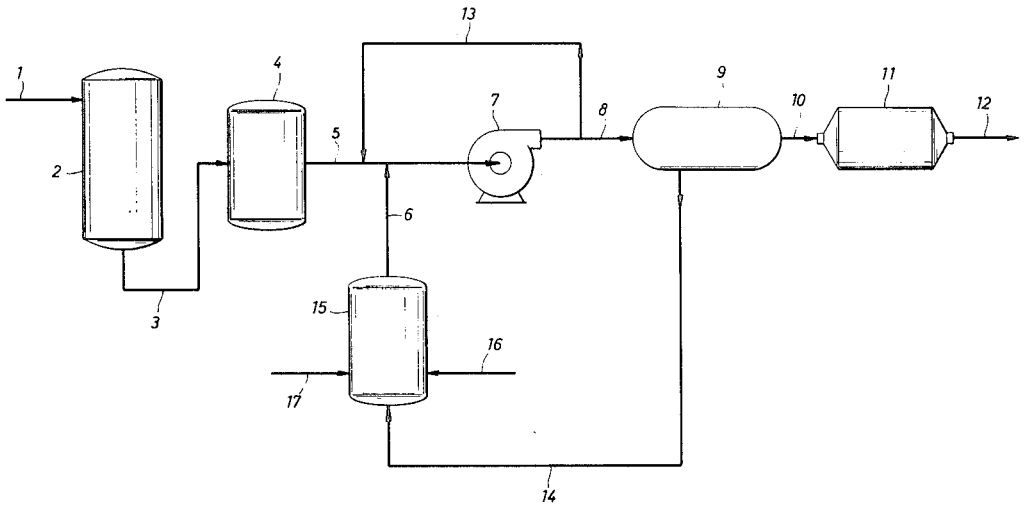

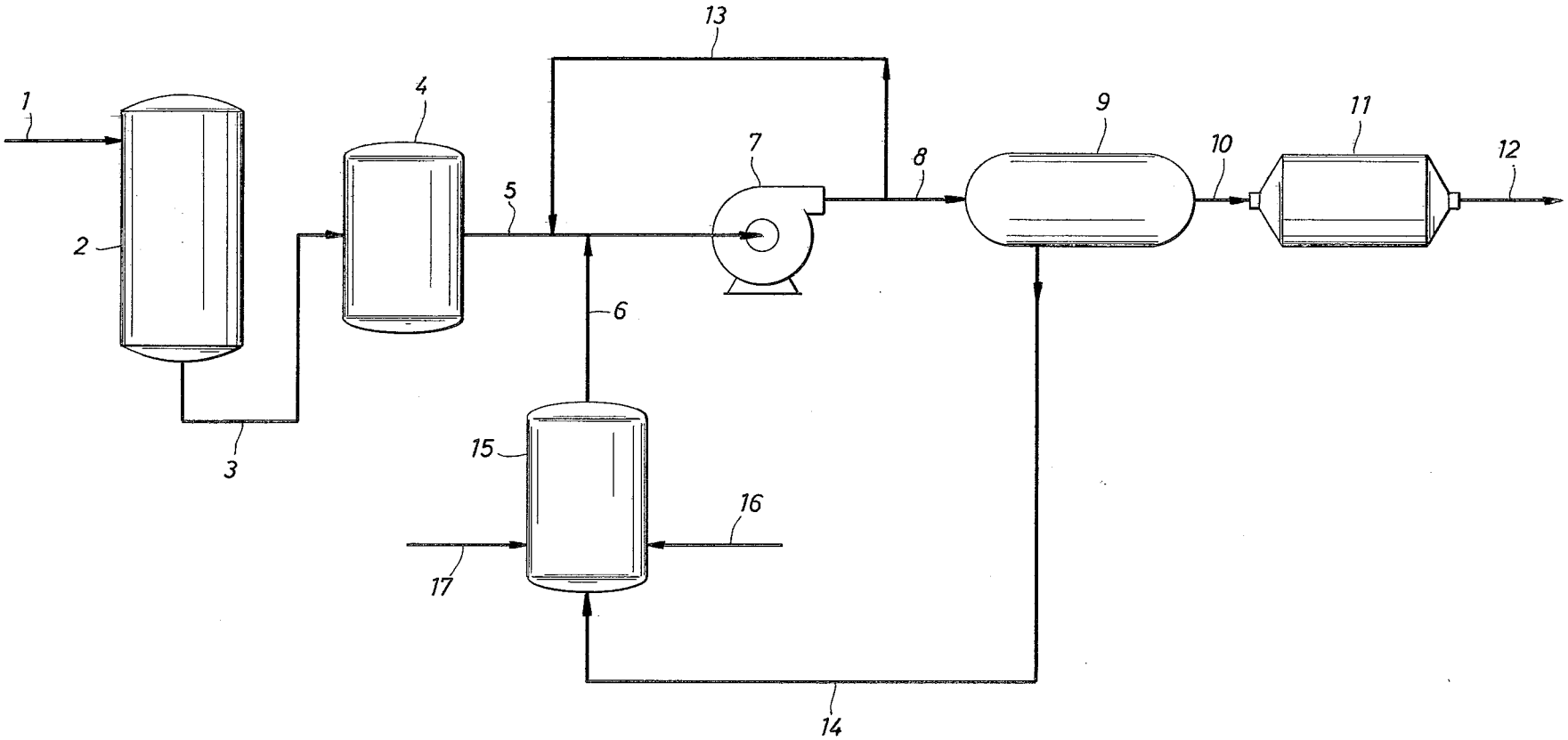
1
2
3
4
5
6
7
8
9
10
11
12
13
14
15
16
17